United States Patent
Smith (10) Patent No.: US 9,361,294 B2
(45) Date of Patent: Jun. 7, 2016

(54) PUBLISHING TOOL FOR TRANSLATING DOCUMENTS

(75) Inventor: Michael H. Smith, Milton (AU)

(73) Assignee: Red Hat, Inc., Raleigh, NC (US)

( * ) Notice: Subject to any disclaimer, the term of this patent is extended or adjusted under 35 U.S.C. 154(b) by 1206 days.

(21) Appl. No.: 11/809,462

(22) Filed: May 31, 2007

(65) Prior Publication Data

US 2008/0300863 A1 Dec. 4, 2008

(51) Int. Cl.
*G06F 17/00* (2006.01)
*G06F 17/28* (2006.01)
*G06F 17/22* (2006.01)
*G06F 17/30* (2006.01)
*G06F 17/24* (2006.01)
*G06Q 10/10* (2012.01)

(52) U.S. Cl.
CPC ............ *G06F 17/289* (2013.01); *G06F 17/227* (2013.01); *G06F 17/2247* (2013.01); *G06F 17/2264* (2013.01); *G06F 17/24* (2013.01); *G06F 17/248* (2013.01); *G06F 17/28* (2013.01); *G06F 17/3089* (2013.01); *G06F 17/30286* (2013.01); *G06F 17/30905* (2013.01); *G06Q 10/10* (2013.01)

(58) Field of Classification Search
CPC . G06F 17/318; G06F 17/227; G06F 17/2264; G06F 17/289; G06F 17/2247; G06F 17/3089; G06F 17/24; G06F 17/28; G06F 17/30286; G06F 17/248; G06F 17/30905; G06Q 10/10
USPC ......... 715/264, 265, 273, 277, 731, 234–236; 704/1–9
See application file for complete search history.

(56) References Cited

U.S. PATENT DOCUMENTS

| | | | |
|---|---|---|---|
| 5,448,695 | A | 9/1995 | Douglas et al. |
| 5,568,383 | A | 10/1996 | Johnson et al. |
| 5,664,183 | A | 9/1997 | Cirulli et al. |
| 5,760,775 | A | 6/1998 | Sklut et al. |
| 5,777,876 | A | 7/1998 | Beauchesne |
| 5,835,898 | A | 11/1998 | Borg et al. |
| 5,836,444 | A | 11/1998 | Hoevel et al. |
| 5,848,386 | A | 12/1998 | Motoyama |
| 5,917,484 | A | 6/1999 | Mullaney |
| 5,983,182 | A | 11/1999 | Moore |
| 5,987,402 | A | 11/1999 | Murata et al. |
| 6,002,396 | A | 12/1999 | Davies |
| 6,110,213 | A | 8/2000 | Vinciarelli et al. |
| 6,139,201 | A | 10/2000 | Carbonell et al. |
| 6,175,839 | B1 | 1/2001 | Takao et al. |
| 6,208,956 | B1 | 3/2001 | Motoyama |
| 6,272,508 | B1 | 8/2001 | Dyne et al. |
| 6,411,314 | B1 | 6/2002 | Hansen et al. |

(Continued)

OTHER PUBLICATIONS

Senellart et al., "Systran Translation Stylesheets: Machine Translation Drive by XSLT" Published 2005 by RenderX pp. 1-15.*

(Continued)

*Primary Examiner* — Quoc A Tran
(74) *Attorney, Agent, or Firm* — Lowenstein Sandler LLP (57) ABSTRACT

Some embodiments of a publishing tool to translate documents have been presented. In one embodiment, a master document written in a first natural language is received. The master document is repurposed to generate a set of output documents in one or more predetermined formats, wherein each of the output document is in a distinct one of a set of natural languages.

24 Claims, 4 Drawing Sheets

(56) References Cited

U.S. PATENT DOCUMENTS

| | | | |
|---|---|---|---|
| 6,526,426 B1 | 2/2003 | Lakritz | |
| 6,589,291 B1 | 7/2003 | Boag et al. | |
| 6,598,015 B1* | 7/2003 | Peterson et al. | 704/3 |
| 6,654,737 B1 | 11/2003 | Nunez | |
| 6,879,997 B1 | 4/2005 | Ketola et al. | |
| 7,139,696 B2 | 11/2006 | Tokieda et al. | |
| 7,171,348 B2 | 1/2007 | Scanlan | |
| 7,292,987 B2 | 11/2007 | Flanagan | |
| 7,356,458 B1 | 4/2008 | Gonos | |
| 7,428,578 B1 | 9/2008 | Hull et al. | |
| 7,512,532 B2 | 3/2009 | Kimpara | |
| 7,567,941 B2 | 7/2009 | Sagi et al. | |
| 7,580,960 B2 | 8/2009 | Travieso et al. | |
| 7,584,216 B2 | 9/2009 | Travieso et al. | |
| 7,627,817 B2 | 12/2009 | Travieso et al. | |
| 7,716,037 B2 | 5/2010 | Precoda et al. | |
| 7,802,179 B2 | 9/2010 | Bissonnette et al. | |
| 8,205,151 B2 | 6/2012 | Smith | |
| 8,645,816 B1* | 2/2014 | Kelley et al. | 715/236 |
| 2001/0029455 A1* | 10/2001 | Chin et al. | 704/277 |
| 2001/0041494 A1 | 11/2001 | Barad | |
| 2001/0044868 A1 | 11/2001 | Roztocil et al. | |
| 2002/0012554 A1 | 1/2002 | Haller | |
| 2002/0016803 A1 | 2/2002 | Ryan et al. | |
| 2002/0049702 A1 | 4/2002 | Aizikowitz et al. | |
| 2002/0054101 A1 | 5/2002 | Beatty | |
| 2002/0055798 A1 | 5/2002 | Haye | |
| 2002/0069196 A1 | 6/2002 | Betros et al. | |
| 2002/0077805 A1 | 6/2002 | Hecht et al. | |
| 2002/0111967 A1* | 8/2002 | Nagase | 707/513 |
| 2002/0169842 A1 | 11/2002 | Christansen et al. | |
| 2002/0198904 A1 | 12/2002 | Robles et al. | |
| 2003/0037076 A1 | 2/2003 | Bravery et al. | |
| 2003/0115552 A1 | 6/2003 | Jahnke et al. | |
| 2003/0166373 A1 | 9/2003 | Whitney et al. | |
| 2004/0060005 A1 | 3/2004 | Vasey | |
| 2004/0125406 A1 | 7/2004 | McManus et al. | |
| 2004/0138872 A1* | 7/2004 | Nir | 704/10 |
| 2004/0167784 A1 | 8/2004 | Travieso et al. | |
| 2004/0168132 A1 | 8/2004 | Travieso et al. | |
| 2004/0268306 A1* | 12/2004 | Cheng | G06F 17/2247 717/114 |
| 2005/0021859 A1 | 1/2005 | Willian et al. | 709/246 |
| 2005/0028080 A1 | 2/2005 | Challenger et al. | |
| 2005/0030290 A1 | 2/2005 | de Brebisson | |
| 2005/0055236 A1 | 3/2005 | Bondy et al. | |
| 2005/0060648 A1 | 3/2005 | Fennelly et al. | |
| 2005/0131768 A1 | 6/2005 | Rodriguez et al. | |
| 2005/0132284 A1 | 6/2005 | Lloyd et al. | |
| 2005/0160359 A1* | 7/2005 | Falk et al. | 715/513 |
| 2005/0185930 A1 | 8/2005 | Jung et al. | |
| 2005/0223320 A1* | 10/2005 | Brintzenhofe et al. | 715/517 |
| 2005/0240905 A1 | 10/2005 | Pournasseh et al. | |
| 2006/0015763 A1 | 1/2006 | Nakajima | |
| 2006/0036612 A1 | 2/2006 | Harrop et al. | |
| 2006/0064631 A1 | 3/2006 | Parker | |
| 2006/0075329 A1 | 4/2006 | Sullivan et al. | |
| 2006/0080616 A1 | 4/2006 | Vogel et al. | |
| 2006/0100850 A1 | 5/2006 | Lee | |
| 2006/0136387 A1 | 6/2006 | Yalovsky et al. | |
| 2006/0136510 A1 | 6/2006 | Voronov et al. | |
| 2006/0136824 A1 | 6/2006 | Lin | |
| 2006/0167577 A1 | 7/2006 | Clark et al. | |
| 2006/0200766 A1* | 9/2006 | Lakritz | 715/536 |
| 2006/0294418 A1 | 12/2006 | Fuchs | |
| 2007/0027670 A1* | 2/2007 | Verhey-Henke et al. | 704/2 |
| 2007/0156744 A1 | 7/2007 | Harrington | |
| 2007/0180359 A1* | 8/2007 | Giannetti | 715/513 |
| 2007/0192685 A1 | 8/2007 | Morales et al. | |
| 2007/0230750 A1 | 10/2007 | Ikeda et al. | |
| 2007/0282594 A1* | 12/2007 | Spina | 704/9 |
| 2008/0040397 A1 | 2/2008 | Herbeck et al. | |
| 2008/0082317 A1* | 4/2008 | Rosart et al. | 704/8 |
| 2008/0155390 A1 | 6/2008 | Karim et al. | |
| 2008/0172637 A1 | 7/2008 | Chang et al. | |
| 2008/0189096 A1* | 8/2008 | Apte et al. | 704/2 |
| 2008/0235569 A1 | 9/2008 | Arun et al. | |
| 2008/0281804 A1 | 11/2008 | Zhao et al. | |
| 2008/0288474 A1* | 11/2008 | Chin et al. | 707/4 |
| 2008/0301564 A1 | 12/2008 | Smith et al. | |
| 2009/0083848 A1 | 3/2009 | Lawlor | |
| 2009/0089263 A1* | 4/2009 | McHugh et al. | 707/3 |
| 2009/0125497 A1 | 5/2009 | Jiang et al. | |
| 2009/0171961 A1 | 7/2009 | Fredrickson | |
| 2010/0174981 A1* | 7/2010 | Jiang et al. | 715/236 |
| 2012/0173971 A1* | 7/2012 | Sefton et al. | 715/256 |

OTHER PUBLICATIONS

Office Action mailed May 28, 2010 for U.S. Appl. No. 11/809,628, filed May 31, 2007, 41 pages.
Office Action mailed Apr. 1, 2010 for U.S. Appl. No. 11/809,467, filed May 31, 2007, 12 pages.
USPTO, Office Action for U.S. Appl. No. 11/809,467, mailed Oct. 6, 2011, pp. 1-8.
USPTO, Office Action for U.S. Appl. No. 11/809,467, mailed Aug. 18, 2010, pp. 1-11.
USPTO, Office Action for U.S. Appl. No. 11/809,467, mailed Aug. 18, 2010, pp. 1-12.
USPTO, Office Action for U.S. Appl. No. 11/809,628, mailed Oct. 27, 2010, pp. 1-44.
USPTO, Office Action for U.S. Appl. No. 11/809,628, mailed Aug. 25, 2011, pp. 1-47.
USPTO, Notice of Allowance for U.S. Appl. No. 11/809,628, mailed Feb. 17, 2012, pp. 1-11.
USPTO, Office Action for U.S. Appl. No. 11/809,467, mailed Apr. 25, 2012, 99 1-13.
USPTO, Office Action for U.S. Appl. No. 11/809,467, mailed Jun. 14, 2013.
Office Action for U.S. Appl. No. 11/809,467, mailed Sep. 26, 2013.
Office Action for U.S. Appl. No. 11/809,467, mailed Feb. 26, 2014.
USPTO, Office Action for U.S. Appl. No. 11/809,467, mailed Jun. 3, 2014.
USPTO, Advisory Action for U.S. Appl. No. 11/809,467, mailed Sep. 21, 2010.
USPTO, Advisory Action for U.S. Appl. No. 11/809,467, mailed Aug. 6, 2014.
USPTO, Advisory Action for U.S. Appl. No. 11/809,628, mailed Dec. 15, 2010.
USPTO, Notice of Allowance for U.S. Appl. No. 11/809,628, mailed Feb. 17, 2012.
XSL Transformations, from Wikipedia. http://en.wikipedia.org/wiki/XSLT. Apr. 9, 2007. 7 pages.
FOP (Formatting Objects Processor) rom Wikipedia. http://en.wikipedia.org/wiki/FOP. Apr. 9, 2007. 2 pages.
Stylesheet Language, from Wikipedia. http://en.wikipedia.org/wiki/Stylesheets. Apr. 2, 2007. 2 pages.
Docbook, from Wikipedia. http://en.wikipedia.org/wiki/DocBook. Apr. 2, 2007. 4 pages.
Docbook, the Definitive Guide. The Official Documentation for DocBook by O'Reilly. Copywrited 1999. 123 pages.

* cited by examiner

PUBLISHING TOOL FOR TRANSLATING DOCUMENTS

TECHNICAL FIELD

Embodiments of the present invention relate to publishing documents, and more specifically to repurposing documents into different natural languages and/or different formats.

BACKGROUND

Translation of documents is often desired, if not required, in many circumstances. For instance, lots of literary work (e.g., novels, technical publications, product manuals, etc.) is translated into multiple natural languages so that people speaking different languages may be able to read the literary work. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc.

Conventionally, translation is often done by human beings with expertise in the relevant natural languages. However, for huge volumes of literary work, translation may take a lot of time and labor. Thus, some computerized or automated translation tools have been developed to speed up translation. While these conventional tools help to reduce the time it takes to translate literary work, these conventional tools are generally limited to a specific pair of natural languages. That is, one conventional tool for translating English into French, and/or vice versa, typically cannot translate English into German. Users have to use another tool, or another version of the tool, to translate English into German. It is costly for users to purchase multiple tools, or multiple versions of a translation tool, in order to translate one piece of literary work into multiple languages. It is also inconvenient for the users because the users have to install and maintain multiple tools, or multiple versions of the translation tool, on their computer.

In addition to the above problem, the users may have to acquire additional tools to convert the literary work into different formats in order to publish the literary work via multiple different media or channels. For example, the users may have to use a web publishing tool to convert the translated document into Hypertext Markup Language (HTML) in order to publish the literary work over a network (e.g., the Internet). In another example, the users may have to use another word processing tool to convert the translated document into a portable read-only viewing format. As a result, users today may need many tools in order to publish a document in multiple languages and/or various formats.

DESCRIPTION OF THE DRAWINGS

The present invention is illustrated by way of example, and not by way of limitation, in the figures of the accompanying drawings and in which.

DETAILED DESCRIPTION

Described herein are some embodiments of a publishing tool for translating documents. A document as used herein broadly refers to a piece of literary work written in a natural language. As mentioned in the background section, a natural language as used herein generally refers to a language written or spoken by humans for general-purpose communication, such as English, French, German, etc. Some examples of a document include a novel, a news report, a product manual, a user guide, etc. A document input to some embodiments of the publishing tool is hereinafter referred to as a master document. Documents may be encoded in various markup languages, such as, hypertext markup language (HTML), extensible markup language (XML), etc. In general, a markup language provides a set of tags to allow an author to mark up the structure and/or semantic content of a document without dictating the specific appearance of an output generated from the document. In other words, the presentation and the content of the document are separated such that the author of the document does not have to specify or describe the presentation of the document while composing the content of the document.

In one embodiment, the publishing tool receives a master document written in a first natural language. The master document may be encoded in a predetermined markup language. The master document is repurposed to generate a set of output documents in one or more predetermined formats, wherein each of the output document is in a distinct one of a set of natural languages. Further, the output documents may be published via different media or channels. Publishing a document generally refers to making the document available for a group of people to view, such as subscribers of a particular service, purchasers of a product, attendees of a conference, the general public, etc. Details of some embodiments of the publishing tool are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, compact disc read-only memories (CD-ROMs), and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

Figure 1A:
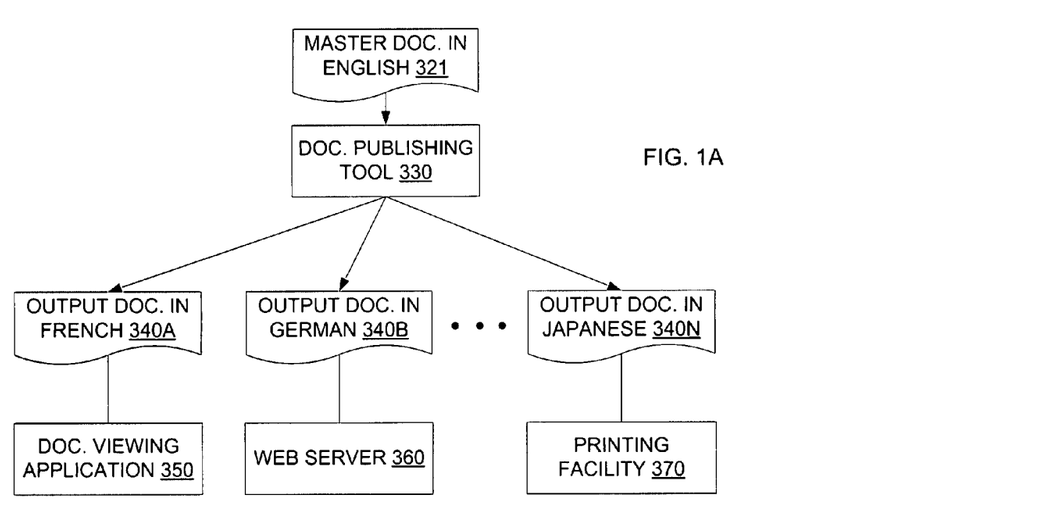
FIG. 1A illustrates one embodiment of a document publishing flow.

FIG. 1A illustrate one embodiment of a document publishing flow. A master document in English 321 is input to a document publishing tool 330. The document publishing tool 330 repurposes the master document 321 by translating the master document 321 into a set of predetermined natural languages and/or converting the master document 321 into one or more predetermined formats. Then the document publishing tool 330 generates a number of output documents 340A-340N suitable for publishing. For example, output document 340A is a French version of the master document 321 in a format supported by the document viewing application 350 (e.g., a Portable Document Format (PDF) reader). Output document 340B is a German version of the master document 321 in a format usable by the web server 360 (e.g., HTML) to post the output document 340B over a network (e.g., an Intranet, the Internet, etc.). Alternatively, the web server 360 may incorporate the output document 340B into a networked assistance system and/or directory. For example, the output document 340B contains an answer to a frequently asked question about a product and the web server 360 incorporates the document 340B into an online help system for German-speaking users of the product. Output document 340N is a Japanese version of the master document 321 in a format usable by the printing facility 370 to print hardcopies of the document 340N.

As illustrated in FIG. 1A, users may translate the master document 321 into multiple natural languages and/or into one or more formats using the document publishing tool 330. There is no need to install multiple tools or multiple versions of a translation tool in order to translate the master document 321 into multiple natural languages. Thus, the above approach is more convenient and cost-effective for the users.

Note that the specific natural languages and document formats used in illustrating the techniques in the current disclosure are merely some of the examples. The concepts disclosed herein are not limited to these specific natural languages and document formats.

Document Repurposing

Figure 1B:
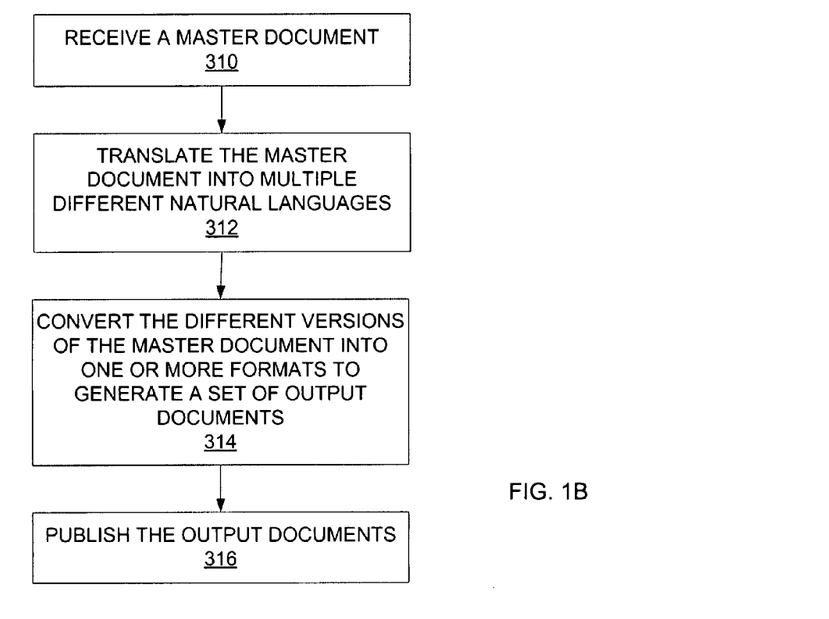
FIG. 1B illustrates one embodiment of a process to repurpose a document.

FIG. 1B illustrates one embodiment of a process to repurpose a document. The process may be performed by processing logic that comprises hardware (e.g., circuitry, dedicated logic, programmable logic, microcode, etc.), software (such as instructions run on a processing device), firmware, or a combination thereof. For example, a server having a processor to execute instructions retrieved from the server's memory may perform at least part of the process described below.

Initially, processing logic receives a master document (processing block 310). In some embodiments, a user inputs the master document via a user interface (e.g., a graphical user interface, a command line interface, etc.) on a client machine, which then sends the master document to a server over a network. Alternatively, the user may input the master document via a user interface provided by a server. The master document is written in a particular natural language, such as English. In some embodiments, the master document is encoded in XML. In some embodiments, the master document is in a translation file. For example, in a UNIX environment, the translation file may be a portable object file, from which different translations may be generated without modifying the portable object file. After receiving the master document, processing logic repurposes the master document as described below.

Processing logic translates the master document into a set of predetermined natural languages, such as French, German, Japanese, etc. (processing block 312). In some embodiment, processing logic may use stylesheets of the relevant natural languages containing vocabularies and/or phrases of the relevant natural languages to translate the master document. In some embodiments, the stylesheets are written in a stylesheet language, such as Document Style Semantics and Specification Language (DSSSL), Cascading Style Sheets (CSS), Extensible Style Language (XSL), Extensible Stylesheet Language Transformations (XSLT), etc. To translate the master document into a second natural language, processing logic may map the vocabularies and/or phrases in the master document to the corresponding vocabularies and/or phrases in the stylesheet associated with the second natural language, and then compose a translation using the corresponding vocabularies and/or phrases from the stylesheet. Using stylesheets for different natural languages, processing logic generates multiple documents from the master document in these different natural languages. These documents are hereinafter referred to as the translated documents.

In some embodiments, processing logic further converts each of the translated documents into a predetermined format to generate a set of output documents (processing block 314). Again, processing logic may use one or more stylesheets associated with a particular format to convert a translated document into an output document in the particular format. For example, processing logic may convert a first one of the translated documents into HTML for publication over a network, a second one of the translated documents into PDF format, etc.

Finally, processing logic publishes the set of output documents (processing block 316). In some embodiments, processing logic puts the set of output documents into various media accessible by one or more groups of people. For example, processing logic may provide one of the output documents to a networked server that posts the respective output document over a network (e.g., an intranet, the Internet, etc.). Alternatively, processing logic may send one of the output documents to a printing facility or a printer to be printed. In another embodiment, processing logic may send one of the output documents to the user in a format viewable by the user (e.g., in PDF format) via electronic mail.

Note that the operations described above may be performed in a different sequence in some embodiments. For instance, processing logic may convert the master document into a particular format before translating the master document into multiple different natural languages. The flow of operations described above is merely one example for illustrating the concept.

Figure 2:
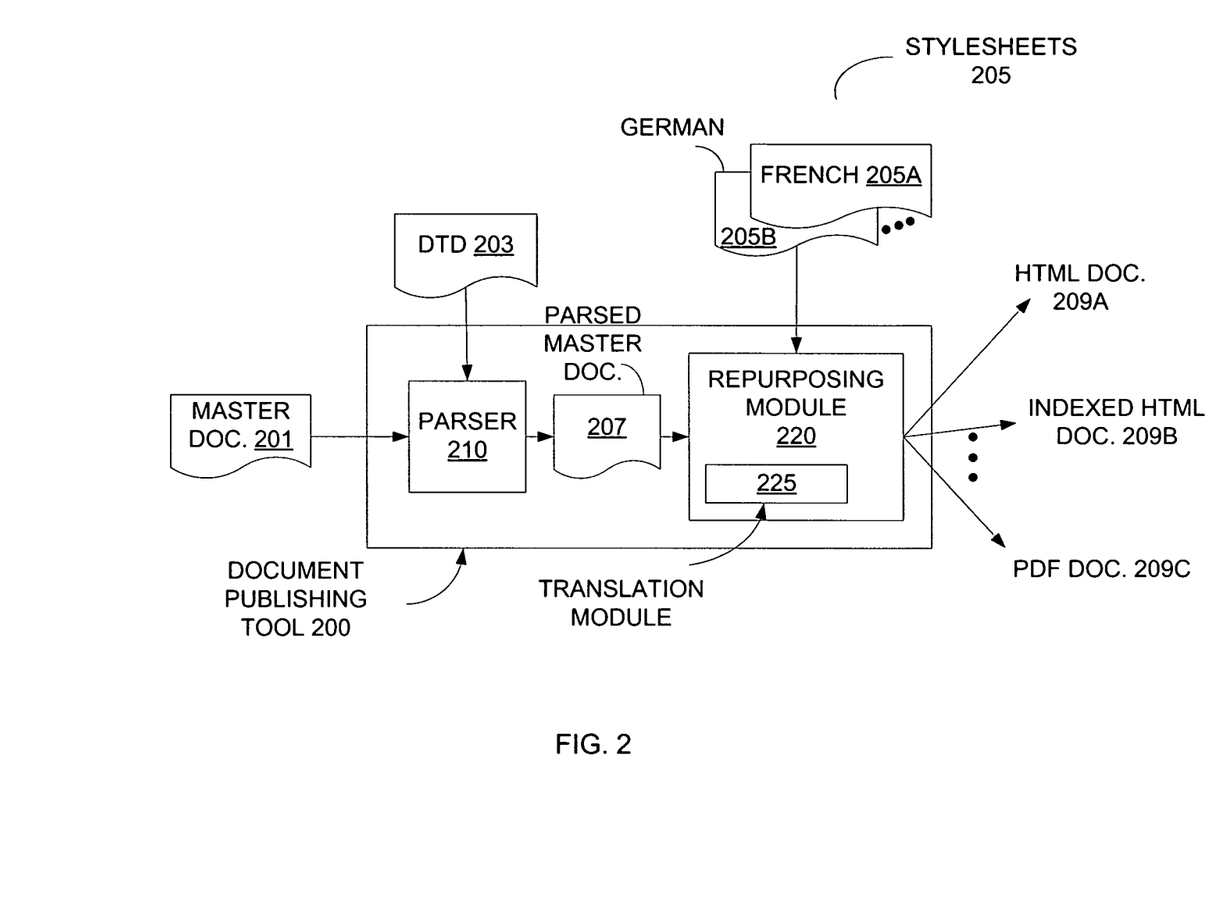
FIG. 2 illustrates one embodiment of a document publishing tool.

FIG. 2 illustrates a functional block diagram of one embodiment of a document publishing tool. The document publishing tool 200 may be implemented by a script (e.g., build.xml) executable on a computing machine, such as the one illustrated in FIG. 4. The document publishing tool 200 includes a parser 210 and a repurposing module 220, which are operatively coupled to each other. The repurposing module 220 includes a translation module 225. The document publishing tool 200 receives a master document 201 written in a natural language, such as English. In some embodiments, the master document 201 is encoded in a markup language, such as XML. Further, the master document 201 may be in the form of a portable object file.

In some embodiments, the master document 201 is input into the parser 210 of the document publishing tool 200. The parser 210 parses and validates the master document 101 using elements from a Document Type Definition file (DTD) 203. An element is a term that describes a document's content and/or structure. The DTD 203 includes a set of elements defined for the markup language in which the master document 201 is written. In addition, the DTD 203 describes the way the elements and the corresponding contents in the master document 201 should be presented, such as the order of the elements. The parser 210 reads the DTD 203 and the master document 201, parses the master document 201, and determines whether the way the master document 201 is written is valid according to the DTD 203. If the master document 201 is written in an invalid way, the parser 210 outputs one or more error messages on the errors found in the master document 201. Otherwise, the parser 210 forwards the parsed master document 207 to the repurposing module 220.

The repurposing module 220 includes the translation module 225 to translate the master document 201 into multiple natural languages. In one embodiment, a user of the document publishing tool 200 has indicated which natural languages are desired (e.g., French, German, Japanese, etc.). For example, the user may have indicated the desired natural languages by including the corresponding language attributes (e.g., "en" for English, "de" for German, "fr" for French, etc.) in the master document 201. Based on the user indication, the translation module 225 uses the corresponding stylesheets to translate the master document 201 into multiple natural languages.

In some embodiments, each of the stylesheets 205 is written in a stylesheet language, such as DSSSL, CSS, XSL, XSLT, etc. A stylesheet used for translating the master document 201 into another natural language (hereinafter, the target natural language) contains vocabularies and/or phrases of the target natural language. For example, stylesheet 205A is used for translating the master document 201 into French and contains vocabularies and/or phrases in French. Likewise, stylesheet 205B is used for translating the master document 201 into German and contains vocabularies and/or phrases in German. Using the vocabularies and/or phrases in the corresponding stylesheets, the translation module 225 may translate the master document 201 into multiple target natural languages and create a translated document for the master document 201 in each of the target natural languages (e.g., a French version of the master document 201, a German version of the master document 201, etc.).

In some embodiments, the repurposing module 220 may further convert the translated documents into one or more formats using one or more of the stylesheets 205 to generate a set of output documents, such as output documents 209A-209C. For each output document format, there is at least one stylesheet specifying the corresponding details, such as the font type and size for a heading of a chapter, the output file type (e.g., HTML, PDF, etc.). Based on the specification in the stylesheet, the master document 201 may be formatted into a predetermined style. Note that the formatting does not change the master document 201. In other words, the repurposing module 220 does not overwrite the master document 201. Instead, an output document is created to hold the formatted document. In one embodiment, the user specifies which output formats are desired.

The output documents are published in one or more ways according to their corresponding formats. As mentioned above, to publish a document is to make the document available to a group of people to access. In some embodiments, the output documents 209A and 209B, which are in HTML and indexed HTML, respectively, are incorporated into a networked user assistance system (also commonly referred to as an online help system), where users of the system may view the incorporated documents via a network access application (e.g., an Internet browser, a special-purpose graphical user interface of the assistance system, etc.). Alternatively, the output documents 209A and 209B may be posted on a network (e.g., an intranet, a publicly accessible network, such as the Internet, etc.), where users or subscribers of the network may browse the posted document. In another embodiment, the output document 209C is sent to a printing facility to be printed into hardcopies or embodied in some physical machine-readable media (e.g., compact disks (CDs), digital video disks (DVDs), etc.). Note that the embodiments listed above are merely some of the exemplary ways to publish the output documents 209A-209C. Other embodiments of the document publishing tool 200 may publish the output documents 209A-209C, or cause the output documents 209A-209C to be published, in another way.

The document publishing tool 200 described above may be implemented in various embodiments of a system. Some embodiments of the architecture of the system are discussed below to illustrate the concept. However, one should appreciate that variations to the following examples are possible in other embodiments.

System Architecture

Figure 3A:
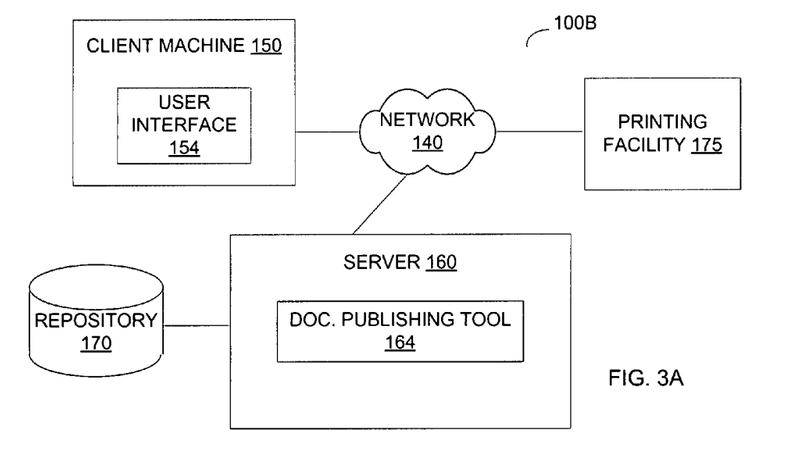
FIGS. 3A and 3B illustrate some embodiments of an architecture of a publishing system in which embodiments of the present invention may be implemented.

FIG. 3A illustrates one embodiment of a system in which embodiments of the present invention may be implemented. The system 100B includes a client machine 150, a network 140, a printing facility 175, a server 160, and a repository 170. Some examples of the client machine 150 include a desktop personal computer (PC), a laptop PC, a personal digital assistant (PDA), a cellular telephone or mobile telephone, etc. The client machine 150 includes a user interface module 154. The server 160 includes a document publishing module 164. The server 160 is communicatively coupled to the client machine 150 via the network 140. The server 160 may be further coupled to the repository 170, such as a lightweight directory access protocol (LDAP) repository. The network 140 may include various kinds of networks, such as a local area network (LAN), a wide area network (WAN), a wireless network, a wired network, etc.

Note that any or all of the components and the associated hardware illustrated in FIG. 3A may be used in various embodiments of the system 100B. However, it should be appreciated that other configurations of the system 100B may include more or fewer devices than those shown in FIG. 3A.

In some embodiments, the user interface module 154 in the client machine 150 receives a master document. The client machine 150 sends the master document to the server 160 via the network 140. On the server 160, the document publishing tool 164 processes the master document as described above to generate a set of output documents in different natural languages and/or different formats as discussed in detail above. The server 160 may store the master document and the output documents in the repository 170. Further, the server 160 may import a set of stylesheets from the repository 170. In some embodiments, the document publishing tool 164 sends one of the output documents to the printing facility 175 to be published in print, such as printing hardcopies of the output documents, embodying the output documents into machine-readable storage media (e.g., CD, DVD, etc.), etc.

Figure 3B:
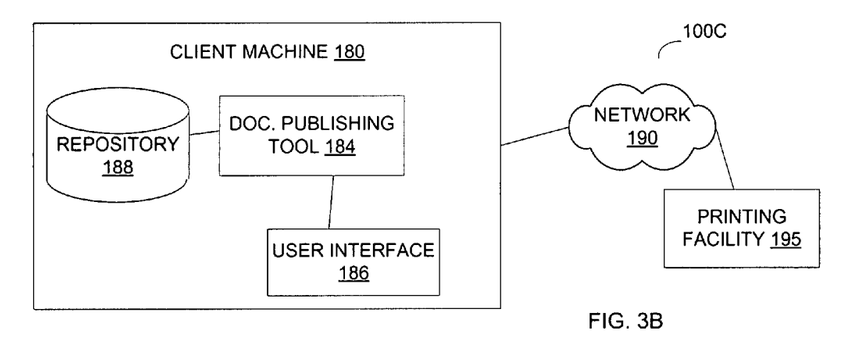

FIG. 3B illustrates another embodiment of a system in which embodiments of the present invention may be implemented. The system 100C includes a client machine 180, a printing facility 195, and a network 190. Some examples of the client machine 180 include a desktop PC, a laptop PC, a PDA, a cellular telephone or mobile telephone, etc. The client machine 180 includes a user interface module 186, a repository 188, and a document publishing tool 184. The repository 188 may include a LDAP repository. The client machine 180 is communicatively coupled to the network 190. The network 190 may include various kinds of networks, such as a LAN, a WAN, wireless network, wired network, etc. Via the network 190, the client machine 180 is communicatively coupled to the printing facility 195.

Note that any or all of the components and the associated hardware illustrated in FIG. 3B may be used in various embodiments of the system 100C. However, it should be appreciated that other configurations of the system 100C may include more or fewer devices than those shown in FIG. 3B.

In some embodiments, the user interface module 186 in the client machine 180 receives a master document. The document publishing tool 184 processes the master document as described above to generate a set of output documents in different natural languages and/or different formats as discussed in detail above. The master document and the output documents may be stored in the repository 188. The repository 188 may further store a set of stylesheets used by the document publishing tool 184 to generate the output documents. In some embodiments, the document publishing tool 184 sends one of the output documents to the printing facility 195 to be published in prints, such as printing hardcopies of the output documents, embodying the output documents into machine-readable storage media (e.g., CD, DVD, etc.), etc.

Figure 4:
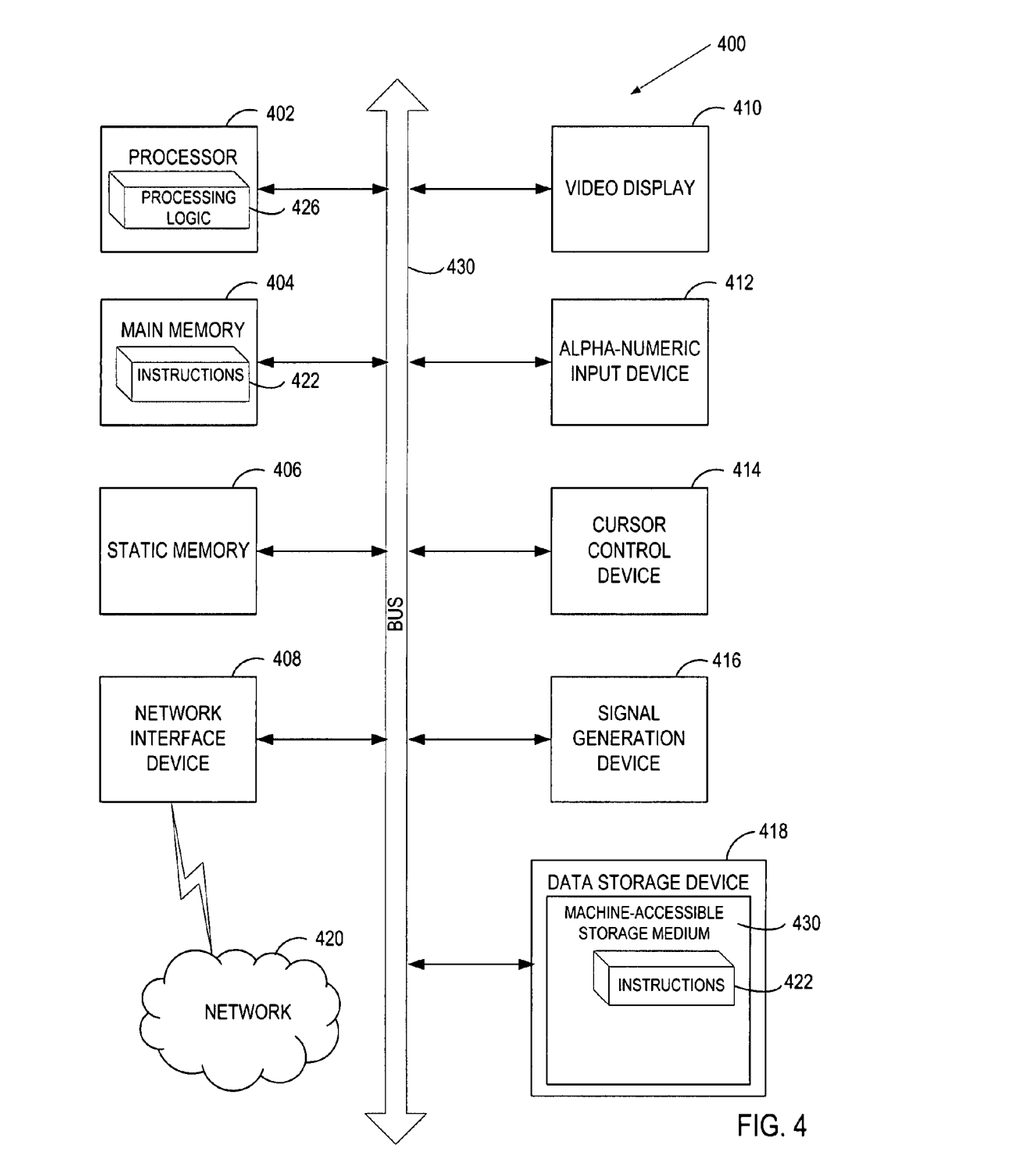
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In some alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a PC, a tablet PC, a set-top box (STB), a PDA, a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a publishing tool to translate documents have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a master document in a first file type and written in a first natural language;
   validating the master document using a document type definition file that defines a structure for the master document, wherein validating the master document comprises:
      parsing the master document to identify elements of the master document, wherein the elements of the master document represent at least one of a structure or contents of the master document, and wherein the document type definition file defines an order for presenting the elements and the contents of the master document; and
      determining that the elements and the contents of the master document are in accordance with the document type definition file;
   upon validation of the master document, repurposing, by a processing device, the master document to generate a plurality of output documents in a plurality of predetermined file types, each of the plurality of predetermined file types different from the first file type and each of the plurality of output documents in a distinct one of a plurality of natural languages, wherein the repurposing comprises:
      generating a plurality of translated documents by translating the master document from the first natural language into each of the plurality of natural languages, and
      generating the plurality of output documents by converting the plurality of translated documents into the plurality of predetermined file types in view of a plurality of stylesheets, wherein each of the plurality of stylesheets corresponds to one of the plurality of predetermined file types, wherein the plurality of stylesheets is used to translate the master document from the first natural language into the plurality of natural languages; and
   publishing the plurality of output documents in the plurality of predetermined file types that are different from the first file type.

2. The method of claim 1, wherein the plurality of output documents are viewable using a document viewing tool supporting the one or more predetermined file types.

3. The method of claim 1, wherein publishing the plurality of output documents comprises:
   incorporating at least one of the plurality of output documents into a networked user assistance system.

4. The method of claim 1, wherein publishing the plurality of output documents comprises:
   posting at least one of the plurality of output documents over a network.

5. The method of claim 1, wherein publishing the plurality of output documents comprises:
   sending at least one of the plurality of output documents to a printing facility to print hardcopies of the at least one of the plurality of output documents.

6. The method of claim 1, wherein the master document is received at a server from a client machine communicatively coupled to the server via a network.

7. The method of claim 1, wherein the master document is received from a user via a user interface being executed on a server.

8. The method of claim 1, wherein the processing device resides within a server.

9. The method of claim 1, wherein the processing device resides within a client machine.

10. An apparatus comprising:
    a memory to store instructions;
    a processing device, operatively coupled to the memory, the processing device to:
    parse a master document in a first file type and written in a first natural language;
    validate the master document using a document type definition file that defines a structure for the master document, wherein to validate the master document the processing device is to:
       parse the master document to identify elements of the master document, wherein the elements of the master document represent at least one of a structure or contents of the master document, and wherein the document type definition file defines an order for presenting the elements and the contents of the master document; and
       determine that the elements and the contents of the master document are in accordance with the document type definition file;
    upon validation of the master document, receive the master document;
    repurpose the master document to generate a plurality of output documents in a plurality of predetermined file types, each of the plurality of predetermined file types different from the first file type and each of the plurality of output documents in a distinct one of a plurality of natural languages, wherein, to repurpose the master document, the processing device is to:
       generate, using the processing device, a plurality of translated documents by translating the master document from the first natural language into each of the plurality of natural languages; and
       generate, using the processing device, the plurality of output documents by converting the plurality of translated documents into the plurality of predetermined file types in view of a plurality of stylesheets, wherein each of the plurality of stylesheets corresponds to one of the plurality of predetermined file types, and wherein the plurality of stylesheets is used to translate the master document from the first natural language into the plurality of natural languages; and
    publish the plurality of output documents in the plurality of predetermined file types that are different from the first file type.

11. The apparatus of claim 10, wherein at least one of the plurality of output documents is viewable using a document viewing tool.

12. The apparatus of claim 10, wherein at least one of the plurality of output documents is incorporated into a networked user assistance system.

13. The apparatus of claim 10, wherein at least one of the plurality of output documents is posted over a network.

14. The apparatus of claim 10, further comprising:
    a network adaptor executed from the memory by the processing device to send at least one of the plurality of output documents to a printing facility to print hardcopies of the at least one of the plurality of output documents.

15. A system comprising:
a processing device; and
an input interface to couple to a network to receive a master document in a first file type and written in a first natural language;
wherein the processing device is to:
  validate the master document using a document type definition file that defines a structure for the master document, wherein to validate the master document the processing device to:
    parse the master document to identify elements of the master document, wherein the elements of the master document represent at least one of a structure or contents of the master document, and wherein the document type definition file defines an order for presenting the elements and the contents of the master document, and
    determine that the elements and the contents of the master document are in accordance with the document type definition file,
  upon validation of the master document, repurpose the master document to generate a plurality of output documents in a plurality of predetermined file types, each of the plurality of predetermined file types different from the first file type and each of the plurality of output documents in a distinct one of a plurality of natural languages, wherein to repurpose the master document, the processing device is to:
    generate, using the processing device, a plurality of translated documents by translating the master document from the first natural language into each of the plurality of natural languages, and
    generate, using the processing device, the plurality of output documents by converting the plurality of translated documents into the plurality of predetermined file types in view of a plurality of stylesheets, wherein each of the plurality of stylesheets corresponds to one of the plurality of predetermined file types; and
  publish the plurality of output documents in the plurality of predetermined file types that are different from the first file type.

16. The system of claim 15, further comprising a document publishing tool that comprises: a parser to parse the master document in view of the set of elements.

17. The system of claim 15, wherein the master document is received from a client machine communicatively coupled to the system via a network.

18. A non-transitory machine-readable storage medium that provides instructions that, when executed by a processing device, cause the processing device to:
  receive a master document in a first file type and written in a first natural language;
  validate the master document using a document type definition file that defines a structure for the master document, wherein to validate the master document the processing device to:
    parse the master document to identify elements of the master document, wherein the elements of the master document represent at least one of a structure or contents of the master document, and wherein the document type definition file defines an order for presenting the elements and the contents of the master document; and
    determine that the elements and the contents of the master document are in accordance with the document type definition file;
  upon validation of the master document, repurpose, by the processing device, the master document to generate a plurality of output documents in a plurality of predetermined file types, wherein each of the plurality of predetermined file types is different from the first file type and each of the plurality of output documents in a distinct one of a plurality of natural languages, wherein, to repurpose the master document, the processing device is to:
    generate a plurality of translated documents by translating the master document from the first natural language into each of the plurality of natural languages, and
    generate the plurality of output documents by converting the plurality of translated documents into the plurality of predetermined file types in view of a plurality of stylesheets, wherein each of the plurality of stylesheets corresponds to one of the plurality of predetermined file types, and wherein the plurality of stylesheets is used to translate the master document from the first natural language into the plurality of natural languages; and
  publish the plurality of output documents in the plurality of predetermined file types that are different from the first file type.

19. The non-transitory machine-readable storage medium of claim 18, wherein the plurality of output documents are viewable using a document viewing tool supporting the one or more predetermined file types.

20. The non-transitory machine-readable storage medium of claim 18, wherein, to publish the plurality of output documents, the processing device is to:
  incorporate at least one of the plurality of output documents into a networked user assistance system.

21. The non-transitory machine-readable storage medium of claim 18, wherein, to publish the plurality of output documents, the processing device is to:
  post at least one of the plurality of output documents over a network.

22. The non-transitory machine-readable storage medium of claim 18, wherein, to publish the plurality of output documents, the processing device is to:
  send at least one of the plurality of output documents to a printing facility to print hardcopies of the at least one of the plurality of output documents.

23. The non-transitory machine-readable storage medium of claim 18, wherein the master document is received at a server from a client machine communicatively coupled to the server via a network.

24. The non-transitory machine-readable storage medium of claim 18, wherein the master document is received from a user via a user interface being executed on a server.

* * * * *